United States Patent [19]

Atkins

[11] Patent Number: 4,491,642
[45] Date of Patent: Jan. 1, 1985

[54] UNIFORMLY PIGMENTED, LOW SHRINKING POLYESTER MOLDING COMPOSITIONS

[75] Inventor: Kenneth E. Atkins, South Charleston, W. Va.

[73] Assignee: Union Carbide Corporation, Danbury, Conn.

[21] Appl. No.: 602,635

[22] Filed: Apr. 25, 1984

Related U.S. Application Data

[63] Continuation of Ser. No. 420,338, Sep. 20, 1982, abandoned, which is a continuation-in-part of Ser. No. 247,991, Mar. 26, 1981, abandoned, which is a continuation of Ser. No. 868,447, Jan. 10, 1978, abandoned, which is a continuation of Ser. No. 737,580, Nov. 1, 1976, abandoned.

[51] Int. Cl.$^3$ .............................................. C08K 3/22
[52] U.S. Cl. .................................. 523/515; 523/508; 523/510; 523/511; 523/516
[58] Field of Search ............... 523/507, 508, 510, 511, 523/515, 516

[56] References Cited

U.S. PATENT DOCUMENTS

| | | | |
|---|---|---|---|
| 2,577,414 | 12/1951 | Fraser et al. | 260/45.4 |
| 3,551,378 | 12/1970 | Rabenold et al. | 260/40 |
| 3,701,748 | 10/1972 | Kroekel | 260/40 |
| 3,718,714 | 2/1973 | Comstock et al. | 260/862 |
| 3,772,241 | 11/1973 | Kroekel | 260/40 R |
| 3,887,515 | 6/1975 | Pennington et al. | 260/40 R |
| 3,988,388 | 10/1976 | Alberts et al. | 260/862 |
| 4,032,494 | 6/1977 | Gentry | 260/29.1 SB |
| 4,172,059 | 10/1979 | Atkins et al. | 260/22 CB |
| 4,284,736 | 8/1981 | Comstock et al. | 525/169 |
| 4,288,571 | 9/1981 | Comstock et al. | 525/170 |

FOREIGN PATENT DOCUMENTS

1276198 6/1972 United Kingdom .

*Primary Examiner*—Allan M. Lieberman
*Assistant Examiner*—Robert E. L. Sellers
*Attorney, Agent, or Firm*—Steven T. Trinker

[57] ABSTRACT

There is disclosed thickened, low shrinkage polyester molding compositions having improved pigmentation. The improved pigmentation in thickenable polyester molding compositions is achieved by using as the low profile additive a vinyl acetate/maleic acid copolymer, and optionally incorporating a surfactant in the composition.

15 Claims, No Drawings

UNIFORMLY PIGMENTED, LOW SHRINKING POLYESTER MOLDING COMPOSITIONS

This application is a continuation of prior U.S. application Ser. No. 420,338 filed Sept. 20, 1982 which is a continuation-in-part of application Ser. No. 247,991 filed Mar. 26, 1981 which is a continuation of application Ser. No. 868,447 filed Jan. 10, 1978 which is a continuation of application Ser. No. 737,580 filed Nov. 1, 1976 all now abandoned.

The invention relates to a means for improving the uniformity of pigmentation in thickenable, low shrink polyester molding compositions.

BACKGROUND OF THE INVENTION

A major advance in commercial polyester molding technology was the introduction several years ago of chemically thickened systems. Chemical thickening is always employed in sheet molding compounds ("SMC"), and is increasingly being used in bulk molding compounds ("BMC"). In such systems, an alkaline material such as magnesium oxide or magnesium hydroxide is added to the uncured polyester along with fillers, glass fiber, and other standard materials. The alkaline material interacts with residual acidity in the polyester to build viscosity. The thickened system is relatively tack-free and easy to handle, and the high viscosity carries the glass fiber reinforcement to the extremities of the mold during crosslinking of the system. Thus, the use of thickened systems has made a major contribution to the commercial expansion of polyester molding.

Another technical improvement that has made a significant contribution to commercial polyester molding technology is the use of low profile additives to reduce shrinkage during the curing reaction, and to thereby improve dimensional stability and surface smoothness. Low profile additives are thermoplastic polymers such as vinyl acetate polymers, polystyrene, acrylic polymers, and polycaprolactones. There are a number of theories that seek to explain the low profile or anti-shrinkage action of these polymers, but the one that seems to best explain the phenomenon is the following:

The low profile additive is at least partly soluble in the uncured polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

When a low profile additive is employed in a thickened composition, the increase of viscosity that occurs can cause the low profile additive to separate, and thereby cause a tacky surface. This problem is usually most severe with the more reactive polyesters, i.e., those having lower molecular weight to double bond ratios. To combat this, carboxylic acid functionality is incorporated in the low profile additive. The thermoplastic polymer itself can then enter the thickening reaction, thereby ensuring that a tack-free surface will result.

However, while alleviating the tackiness problem the introduction of these carboxyls into the thermoplastic can present other difficulties if not properly understood. For the thermoplastics to function optimally as shrinkage control agents they must become incompatible with the crosslinked polyester structure. Therefore, if the polyester resin, carboxylated thermoplastic, and thickening agent structure are not carefully controlled and balanced, the chemical thickening agent can bond the thermoplastic into the thermoset system through the carboxyl groups. This will reduce the amount of thermoplastic-thermoset incompatibility, thus reducing, and in extreme cases, actually eliminating the shrinkage control.

Another property of these composites which can be notably effected by this thickening process is internal pigmentability. Because of the thermoplastic-thermoset incompatibility, low shrink, low profile SMC and EMC is more difficult to uniformly pigment than conventional SMC and BMC. By careful formulation, and with the use of certain pigments, it is possible to balance adequate shrinkage control and dimensional stability with internal pigmentation in thickened polyester composites using commercially available carboxylated polycaprolactone low profile additive. However, truly zero shrink thickened polyester composites have not yet been uniformly and reproducibly pigmented in commercial molds except when certain black pigments were used with carboxylated polycaprolactone low profile additive.

DESCRIPTION OF THE INVENTION

The invention provides a means for improving the uniformity of pigmentation in internally pigmented, thickened polyester molding compositions. In one aspect, the invention provides a curable composition comprising:

(a) an unsaturated polyester resin comprising the reaction product of an olefinically unsaturated dicarboxylic acid or anhydride and a polyol;

(b) an olefinically unsaturated monomer that is copolymerizable with said polyester resin;

(c) a thickening agent comprising an oxide or hydroxide of a metal of Group I, II, or III of the Periodic Table;

(d) a pigment;

(e) a low profile additive comprising a vinyl acetate/maleic acid copolymer; and (f) a surface active compound.

The low profile additive comprising a vinyl acetate/maleic acid copolymer provides the polyester molding compositions of this invention with an unusual combination of shrinkage control and uniform pigmentability.

The polyesters that are employed in the invention are reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxylic acid groups. Such acids include maleic acid or anhydride, fumeric acid, tetrahydrophthalic acid or anhydride, hexachloroendomethylene tetrahydrophthalic anhydride ("chlorendic anhydride"), Diels-Alder adducts of maleic acid or anhydride with compounds having conjugated olefinic unsaturation, such adducts being exemplified by bicyclo[2.2.1]hept-5-en3-2,3-dicarboxylic anhydride, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications are known in the art.

The polyester composition of the invention also contains a monomer that contains ethylenic unsaturation, and which is copolymerizable with the polyester. Styrene is the preferred monomer in commercial practice today, although others can be used. Such others include vinyl toluene, methyl methacrylate, chlorostyrene, and diallyl phthalate.

The said monomer is employed in the polyester composition for the purpose of dissolving the polyester (which is a solid at ambient temperatures, i.e., about 20°–25° C.) to ensure that the polyester composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 35 to about 70, and preferably 40 to 55, weight percent, based on weight of polyester plus monomer, plus low profile additive.

A thickening agent is also employed in the invention. Such materials are known in the art, and include the oxides and hydroxides of the metals of Groups I, II and III of the Periodic Table. Specific illustrative examples of thickening agents include magnesium oxide, calcium oxide, zinc oxide, barium oxide, potassium oxide, magnesium hydroxide, and others known to the art. Thickening agents are normally employed in proportions of from about 0.1 to about 6 weight percent, based upon weight of polyester resin, plus monomer, plus low profile additive.

Pigments are also employed in the invention. Illustrative examples include black iron oxide, titanium dioxide, carbon black, chrome yellow, phthalocyanine blue and green, ceramic black, chrome green, ultramarine blue, chrome-cobalt-alumina turquoise, cobalt aluminate (blue), brown iron oxide, ceramic yellow (antimony, titanium-chrome oxide), titanium pigments (yellow, buff), molydate (orange), chrome orange, manganese (violet), chrome-tin (pink), cadmium mercury (maroon, red, orange), and the like.

Pigments are employed in the invention in conventional proportions, e.g., from about 0.5 to about 10 weight percent, based upon weight of polyester resin plus monomer plus low profile additive.

The invention has shown improvement in pigmentability with all pigments thus far tested.

The invention employs as a low profile additive a vinyl acetate/maleic acid copolymer. These copolymers are usually employed in proportions of from about 6 to 20, and preferably from about 9 to 16, weight percent, based on weight of polyester plus low profile additive, plus monomer.

The polyester molding composition may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester plus monomer plus low profile additive;

2. Fillers such as clay, hydrated alumina, silica, calcium carbonate and others known to the art;

3. Reinforcing fillers such as glass fibers or fabrics, asbestos fibers or fabrics, various organic fibers or fabrics such as those made of polypropylene, acrylonitrile/vinyl chloride copolymer, and others known to the art; and 4. Mold release agents or lubricants, such as zinc stearate, calcium stearate, and others known to the art.

The polyester molding compositions of the invention can be cured under conditions similar to those used for known polyester compositions. Typical curing conditions are a temperature of from about 200° to 350° F. for 1 to 4 minutes at a pressure of 300 to 2000 psi.

In combination with the vinyl acetate/maleic acid copolymer low profile additives, the invention employs a surface active compound. A wide variety of surface active compounds can be employed. As a general rule, the ionic surface active compounds have given the best results. Classes of surfactants that deserve particular mention include:

Alkali metal, alkaline earth metal, and ammonium sulfonates;
certain ethylene oxide adducts of long chain (e.g., $C_9$–$C_{18}$) aliphatic alcohols;
certain polyoxyethylene-polyoxypropylene block copolymers;
polyglycerol oleate;
ethoxylated sorbitan monooleate;
sodium 2-caprylic-1(ethyl beta oxipropanoic acid-)imidazoline;
ethoxylated alkylguanidine amine complex;
sodium and methyl-N-long chain aliphatic taurate;
sodium isethionate coconut ester;
certain ethoxylated long chain alkylphenols;
N-long chain aliphatic quarternary ammonium halide;
Ethoxylated N-long chain aliphatic alcohol quaternary ammonium halide; and
Polydimethylsiloxane oil and certain other silicones.

The surfactant is employed in the invention in effective amounts, usually in the range of from about 0.1 to about 8 weight percent, based on weight and polyester plus low profile additive plus monomer.

The Examples below discuss in more detail the nature and proportion of the surfactants that are used in the invention.

In the uniformly pigmented low shrinking polyester molding compositions of the present invention the low profile additive employed is a vinyl acetate/maleic acid copolymer. (The maleic acid can be replaced by the equivalent fumaric acid or maleic anhydride.) The maleic acid is used in the copolymer in conventional amounts, e.g., in amounts sufficient to provide about 0.1 to about 3 weight percent carboxyl groups, based on weight of copolymer. The molecular weight of the copolymer, and the amounts in which it is used, are conventional for carboxylated vinyl acetate low profile additives. The copolymer is used either with or without surfactant; although its use with a surfactant is preferred in most cases.

EXPERIMENTAL

In the Examples below, the following materials were used:

Polyesters

Polyester A—made from isophthalic acid, maleic anhydride, propylene glycol, and dipropylene glycol in approximate molar proportions of 0.3:0.7:0.8:0.2, respectively;

Polyester B—made from isophthalic acid, maleic anhydride, and propylene glycol in approximate molar proportions of 0.3:0.7:1.0, respectively;

Polyester C—made from maleic anhydride and propylene glycol in molar proportions of 1:1.1; and Polyester D—made from isophthalic acid, maleic anhydride, and propylene glycol, in approximate molar proportions of 1.0:3.0:4.4, respectively.

The above polyesters are further characterized as follows:

TABLE A

| Polyester | Acid Number | Weight % Solids in Styrene | Molecular Weight to Double Bond Ratio |
|---|---|---|---|
| A | 16.4 | 72.4 | 286.7 |
| B | — | — | 244.4 |
| C | 28.5 | 65.5 | 156.1 |
| D | 19.9 | 65.4 | 224.7 |

Miscellaneous Additives

"Camel Wite"—Finely divided calcium carbonate used commercially as a filler in polyesters;

Zinc Stearate—used as a mold release agent;

t-Butyl perbenzoate—a peroxide initiator;

p-Benzoquinone—a polymerization inhibitor;

"RS-5988"—a 33 weight percent dispersion of magnesium oxide in a polypropylene maleate polyester;

"Marino H"—Magnesium hydroxide;

"Modifier M"—a 33 weight percent dispersion of magnesium oxide in a polypropylene maleate polyester;

"JM-308A" glass fibers—¼-inch chopped glass fibers, of medium hardness;

"PPG-303" glass fibers—¼-inch chopped glass fibers of medium hardness, but a bit softer than JM-308A; and Alumina trihydrate—a flame retardant filler.

Low Profile Additives

LP-A—40 weight percent solids solution of a 99.2/0.8 (by weight) vinyl acetate/acrylic acid copolymer in styrene, having the following properties:

Solution Viscosity 4000–6000 centipoises at 25° C.

Copolymer Inherent viscosity 0.48; 16–17 Ford cup seconds at 20 percent solids in acetone. $M_N$ 42,000 $M_W$ 92,000

LP-B—40 weight percent solids solution of vinyl acetate/maleic acid copolymer in styrene. Different versions contained from 0.7 to 2.1 weight percent maleic acid in the copolymer, the remainder being vinyl acetate. The styrene solution viscosities varied from about 3400 to about 16,000 centipoises at 25° C. The Ford Cup viscosities of the copolymer varied from 12.4 to 17.8 (20 percent in acetone).

LP-C—35 weight percent solution of polystyrene in styrene, having a solution viscosity of 5000 cps at 25° C.; and LP-D—33 weight percent solution of a copolymer of methyl methacrylate, ethyl acrylate, and acrylic acid (weight ratio 85:12.5:2.5) in styrene.

Pigments

PDI-1416—A green pigment;
PDI-1600—An orange pigment;
CM-3308—A gray pigment;
CM-2015—a black pigment; and
CM-3131—A blue pigment.

(The pigments employed were all commercial materials marketed as dispersions in a low molecular weight polyester. The pigment weights indicated in the formulations below are all dispersion weights, and thus include the dispersing medium.)

Surfactants

The surfactants employed are described in the Examples below.

Evaluation

The evaluation of the pigmentation was done visually. Non-uniformity of pigmentation can be manifested in any of several ways, such as the presence of small spots on the sample, cloudiness, flow marks, waviness, lack of color depth, streaks, mottling, and other similar defects. In most cases, the various samples were compared with a control. (The control employed was usually a polyester molding composition containing thickener, pigment, LP-A low profile additive, and no surfactant.)

The invention provides a means for improvement over polyester compositions containing LP-A low profile additive. Even though perfectly uniform pigmentation is not always provided, in its preferred aspects, the invention provides the best combination of uniform pigmentation and shrinkage control that is presently available in thickened polyester molding compositions.

EXAMPLE 1

Bulk molding compounds were made from the following formulations:

TABLE I

| Component | 1 | 2 | 3 | 4 |
|---|---|---|---|---|
| Polyester D | 60 | 60 | 60 | 60 |
| LP-B[1] | 35 | 35 | — | — |
| LP-A | — | — | 35 | 35 |
| Styrene | 5 | 2 | 5 | 2 |
| Surfactant A[2] | — | 6 | — | 6 |
| Camel Wite | 175 | 175 | 175 | 175 |
| Zinc Stearate | 3 | 3 | 3 | 3 |
| PD1-1416 | 10.5 | 10.5 | 10.5 | 10.5 |
| Modifier M[3] | 0.53 | 0.7 | 2.5 | 2.5 |
| t-butyl perbenzoate | 1.0 | 1.0 | 1.0 | 1.0 |
| ¼ - inch glass | 20 | 20 | 20 | 20 |

TABLE I-continued

| Component | 1 | 2 | 3 | 4 |
|---|---|---|---|---|
| fibers[(4)] | | | | |

[(1)]40 weight percent styrene solution of copolymer of 98.5 percent vinyl acetate and 1.5 percent maleic acid, the solution having a viscosity of 15,720 centipoises at 25° C.
[(2)]Sodium salt of isododecylbenzene sulfonic acid ("Siponate DS-10", Alcolac Chemical Company), 50 weight percent solution in styrene.
[(3)]Less magnesium oxide is required with the formulation containing LP-B than with the one containing LP-A because the higher proportion of carboxyl groups in LP-A causes more viscosity build-up (i.e., thickening). Run 2 uses slightly more than Run 1 because of the effect of the particular surfactant used. Run 4 was not similarly adjusted for presence of surfactant because the overall proportion of magnesium oxide in Runs 3 and 4 was much higher than in Runs 1 and 2, and the effect of the surfactant was therefore not sufficient to require adjustment.
[(4)]Runs 1–4 were first made using PPG-303 glass fibers, and were then repeated using JM-308A glass fibers.

The general procedure for making bulk molding compounds that was used in this Example 1 and in many of the other Examples was the following:

General Procedure for Preparation of Bulk Molding Compound (BMC) Formulations The liquid components (including the pigment dispersion) were weighed individually into a Hobart mixing pan placed on a Toledo balance. The t-butyl perbenzoate was weighed into a vial and added to the contents of the pan and the pan was attached to a Model C-100 Hobart mixer (in a hood). The agitator was started at slow speed, then increased to medium speed to completely mix the liquids and pigment over a period of 3 to 5 minutes. The agitator was then stopped, and the zinc stearate (internal mold release agent) was added to the liquid from an ice cream carton. The Hobart mixer was restarted and the zinc stearate mixed with the liquid until it was completely wet-out. The Camel Wite (calcium carbonate filler)* was next added to the pan contents (agitator off) then mixed, using medium to high speed, until a consistent paste was obtained. The mixer was again stopped and the weighed amount of Modifier M was poured into the pan from a tared beaker. The Modifier M was mixed into the paste over a period of 2–3 minutes, the mixer was again stopped **, and 175 grams of the paste was removed from the pan (using a large spatula) and transferred to a wide-mouthed 4-ounce bottle. This paste sample was stored in the capped bottle at room temperature and the viscosity was measured periodically using a Model HBT Brookfield Viscometer on a Helipath Stand.
*or other fillers
**reweighed and styrene loss made up After removal of the paste sample, the chopped glass fibers were added slowly (from an ice cream carton) to the pan with the mixer running on low speed. The mixer was run for 30 seconds after all the glass was in the paste. This short time gave glass wet-out without glass degradation. The pan was then removed from the mixer and separate portions of the BMC mix of 650 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached a desired value. The mixes in this study usually reached this viscosity within 24 hours of their preparation.

The general procedure for molding the samples of BMC was the following:

General Procedure for Molding Panels

The equipment used for compression molding of panels from the glass reinforced unsaturated polyester molding mixes was a 75-ton, Queen's hydraulic press fitted with a 12×12 inch matched metal die mold (chromed surface). The dies were heated to 300° F., and the 650 gram portion of mix was removed from the foil and placed in the mold. The mold was quickly closed (without stops) to a pressure of 600 psi, and the panel was cured for 2 minutes at 600 psi/300° F. The mold was opened, the panel was quickly removed, and allowed to cool (in a hood) under weights (to avoid warpage).

(Where any significant departures were made from the indicated general procedures for preparation of the BMC and molded panel, they are stated in the text.

Panels were molded (at 500 psi) from the above-described formulations, and were measured for shrinkage and were visually evaluated for uniformity of pigmentation. The pigmentation ratings are as follows: Good=3; Fair=2; Fair-Poor=1.5; Poor=1;

The results are shown in Table II.

The data in Table II shows that LP-B (of this invention) has better pigmentation than LP-A. Also, LP-B with surfactant has better pigmentation than LP-A with surfactant.

TABLE II

| Glass Fiber | Low Profile Additive | Surfactant | Molding Viscosity, × $10^{-6}$, centipoises | Shrinkage, mils/inch | Pigmentation | Izod Impact Strength-ft-lbs/inch |
|---|---|---|---|---|---|---|
| JM-308A | LP-B | A | 8.5 | 0.25 | Good (3) | 6.1 |
| JM-308A | LP-B | none | 23.2 | 0.60 | Fair (2) | 5.0 |
| JM-308A | LP-A | A | 14.4 | 0.30 | Fair (2) | 5.0 |
| JM-308A | LP-A | none | 42.4 | 0.35 | Poor (1) | 4.5 |
| PPG-303 | LP-B | A | 7.5 and 34.8 | 0.30 | Fair (2) | 3.9 |
| PPG-303 | LP-B | none | 68.8 | 0.60 | Fair-Poor (1.5) | 4.0 |
| PPG-303 | LP-A | A | 19.2 | 0.20 | Fair-Poor (1.5) | 3.0 |
| PPG-303 | LP-A | none | 19.8 and 44.8 | 0.25 | Poor (1) | 3.1 |

Shrinkage is determined on these 12×12 inch panels by measuring the length of each of the four sides with a microcaliper, adding the four lengths together, substracting this sum from 48, and then dividing the difference by 48 to thereby obtain the total shrinkage in mils-/inch.

EXAMPLE 2

A series of bulk molding compounds were made and molded into panels by the general procedures described in Example 1. The formulations, shrinkage, and results of evaluation for pigmentation are displayed in Table III. The LP-B low profile additive employed was the one described above in Example 1.

TABLE III

| Component | Run No. 1 | 2 | 3 | 4 | 5 |
|---|---|---|---|---|---|
| Polyester A | 60 | — | 60 | — | — |
| Polyester B | — | 60 | — | 60 | — |
| Polyester C | — | — | — | — | 60 |
| LP-B | 30 | 30 | 30 | 30 | 30 |
| Styrene | 10 | 10 | 10 | 10 | 10 |
| Camel Wite | 200 | 200 | 200 | 200 | 200 |
| Pigment (CM-2015) | 12 | 12 | 12 | 12 | 12 |
| Zinc Stearate | 4 | 4 | 4 | 4 | 4 |
| t-Butyl perbenzoate | 1.1 | 1.1 | 1.1 | 1.1 | 1.1 |
| MgO | 0.6 | 0.6 | — | — | — |
| Mg(OH)$_2$ | — | — | 2.0 | 2.0 | 2.0 |
| Glass (PPG-303) | 15 | 15 | 15 | 15 | 15 |
| Shrinkage, mils/inch | 3.5 | 1.9 | 2.7 | 0.9 | 0.7 |
| Pigmentation | Good | Good | Good | Fair | Fair–Poor (clouds) |

CONTROL 1

A series of bulk molding compounds were made and then molded by the general procedures described in Example 1 from the formulations displayed in Table IV:

TABLE IV

| Component | Run No. 1 | 2 | 3 | 4 |
|---|---|---|---|---|
| Polyester D | 750 | 750 | — | — |
| Polyester C | — | — | 360 | 360 |
| Styrene | 125 | 73 | 30 | — |
| LP-A | 375 | — | 210 | — |
| LP-C | — | 420 | — | 240 |
| Camel Wite | 2500 | 2500 | 900 | 900 |
| t-Butyl perbenzoate | 13 | 13 | 9 | 9 |
| Zinc Stearate | 40 | 40 | 24 | 24 |
| Modifier M (MgO) | 30 | 38 | 18 | 18 |
| Glass (PPG-303) | 671 | 671 | 250 | 250 |
| CM-2015 Pigment | 148 | 148 | — | — |
| CM-2020 Pigment | — | — | 50 | 50 |

The panels were measured for shrinkage and were evaluated visually for pigmentation, which was judged on the depth of color, uniformity, and presence of mottling. The results are displayed in Table V:

TABLE V

| Run | Polyester | Low Profile Additive | Shrinkage, mils/inch | Pigmentation |
|---|---|---|---|---|
| 1 | D | A | 0.27 | Fair |
| 2 | D | C | 2.00 | Good |
| 3 | C | A | 0.48 | Poor |
| 4 | C | C | 2.3 | Fair to Good |

EXAMPLE 3

A series of bulk mold compositions were made using the general procedure described in Example 1. The basic formulation is shown below in Table VI:

TABLE VI

| Component | Parts by weight |
|---|---|
| Polyester D | 210 |
| Low Profile Additive | varied |
| Surfactant A | varied |
| Styrene | varied |
| Camel Wite | 525 |
| Alumina Trihydrate | 175 |
| Zinc Stearate | 14 |
| Pigment | varied |
| t-Butyl perbenzoate | 4.2 |
| p-Benzoquinone | 0.1 |
| MgO | varied |
| Glass (JM-308A)-to 20% | 234–238 |

The variable parts of the formulations are displayed below in Table VII. The LP-B employed was the one described in Example 1.

TABLE VII

| COMPONENT | RUN NO. 1 | 2 | 3 | 4 | 5 | 6 |
|---|---|---|---|---|---|---|
| LP-A | — | — | — | — | — | 122.5 |
| LP-B | 122.5 | 122.5 | 122.5 | 122.5 | 122.5 | — |
| Styrene | 6 | 17.5 | 6 | 12 | 17.5 | 6 |
| Surfactant A | 22 | — | 22 | 11 | — | 22 |
| CM 3308 | 39 | 39 | — | — | — | — |
| CM 2015 | — | — | 44 | 44 | 44 | 44 |
| PDI 1600 | — | — | — | — | — | — |
| Modifier M | 2.6 | 1.8 | 2.6 | 2.6 | 1.8 | 7 |
| MgO powder (100%) | — | — | — | — | — | — |

The BMC formulations described above were molded in a transfer mold using a 100-ton hydraulic press. 180-Gram charges were added to the ram, and a piston injected the BMC into the several mold cavities using a force of 800 pounds. There were five mold cavities in the transfer mold that were each connected to the ram by 126-millimeter (diameter) feed lines. The circular gates leading into the mold cavities had diameters of 64 millimeters. There were two rectangular cavities, each having dimensions of 5×½×½ inches, a 4-inch diameter by ⅛-inch circular cavity, a 2-inch by ⅛-inch circular cavity, and a 7×½×⅛-inch "dog bone" (tensile testing bar) cavity. The BMC was cured in the mold for 2 minutes at 300° F., and then discharged.

The molded specimens were evaluated as follows:

Shrinkage

The length of one of the nominally 5-inch bars from the same mold cavity were measured in all cases) was measured with micro-calipers. The shrinkage in mils (one mil=0.001 inch) is reported for each run.

Pigmentation

The large circular disk was examined for deepness of color, uniformity, and mottling. The best sample was rated "4", and the worst "1". The others were rated visually using these as standards. The results are displayed in Table VIII:

TABLE VIII

| Run No. | Low Profile Additive | Weight % Surfactant A | Shrinkage, mils | Pigmentation |
|---|---|---|---|---|
| 1 | LP-B | 3 | 12 | 4 |
| 2 | LP-B | — | 10 | 3 |
| 3 | LP-B | 3 | 13 | 3 |
| 4 | LP-B | 1.5 | 10 | 2 |
| 5 | LP-B | — | 17 | 2 |
| 6 | LP-A | 3 | 12 | 1 |

EXAMPLE 4

A series of bulk molding compositions were made, and were then molded using the transfer mold described in Example 3. The several runs differed in the presence or absence of Surfactant A, the proportions (weight percent) of maleic acid in the copolymer of LP-B, and in the molecular weight (as evidenced by styrene solution viscosity) of the copolymer of LP-B.

LP-A control runs were also included. The basic formulation used is shown below in Table IX:

TABLE IX

| Component | Parts, by weight | |
|---|---|---|
| | Run 1 | Runs 2-9 |
| Polyester D | 630 | 210 |
| Low Profile Additive | 408 | 122.5 |
| Surfactant A | 66 | varied |
| Styrene | 18 | varied |
| Camel Wite | 1575 | 525 |
| Aluminum trihydrate | 525 | 175 |
| Zinc Stearate | 42 | 14 |
| PDI-1416 Pigment | 117 | 39 |
| t-Butyl Perbenzoate | 12.6 | 4.2 |
| p-Benzoquinone | 0.1 | 0.1 |
| Modifier M | 16.5 | varied |
| Glass (JM 308A) | 808 | 235 |

The variable parts of the formulation are shown below in Table X, along with the shrinkage, in mils. The best pigmentation was formed in Run No. 1, the worst in Run No. 9, with Runs 2-8 being intermediate between them in descending order. The fact that Run No. 5 was rated better than Run No. 7 appears at this time to be anomolous.

TABLE X

| Run No. | Low Profile Additive | LP Viscosity at 25° C., CPS. | % Acid in LP Additive Copolymer | Parts of Surfactant A | Styrene, parts | Modifier M, parts | Shrinkage, Mils |
|---|---|---|---|---|---|---|---|
| 1 | LP-B | 3920 | 0.71 | 66 | 18 | 16.5 | 16 |
| 2 | LP-B | 3920 | 0.71 | — | 17.5 | 3.5 | 24 |
| 3 | LP-B | 6060 | 1.2 | 22 | 6 | 4.2 | 15 |
| 4 | LP-B | 8060 | 1.6 | 22 | 6 | 3.1 | 18 |
| 5 | LP-B | 14,840 | 1.4 | — | 17.5 | 1.8 | 16 |
| 6 | LP-B | 3400 | 1.1 | 22 | 6 | 4.2 | 14 |
| 7 | LP-B | 14,840 | 1.4 | 22 | 6 | 2.8 | 20 |
| 8 | LP-A | 5000 | 0.8 | 22 | 6 | 12 | 15 |
| 9 | LP-A | 5000 | 0.8 | — | 17.5 | 8 | 16 |

EXAMPLE 5

A series of 12×12 inch panels were compression molded from BMC using the general procedures described above in Example 1. The several runs differed in the proportion of maleic acid in the copolymer of LP-B, and in the molecular weight of the copolymer of LP-B, as evidenced by styrene solution viscosity. No surfactant was used in this series. A control containing LP-A is included. The general formulation is shown below in Table XI:

TABLE XI

| Component | Parts, by weight |
|---|---|
| Polyester D | 360 |
| Low Profile Additive | 210 |
| Styrene | 30 |
| Camel Wite | 1050 |
| PDI 1416 Pigment | 63 |
| Zinc Stearate | 18 |
| Modifier M | varied |
| t-Butyl Perbenzoate | 6 |
| Glass (JM 308A) | 391 |

The variable parts of the formulation are displayed below in Table XII, along with the shrinkage, in mils/inch, measured as described above in Example 1. As was the case in Example 4, the Runs are arranged in the table in descending order of pigmentation rating.

TABLE XII

| Run No. | Low Profile Additive | LP Viscosity at 25° C., cps. | % acid in LP Copolymer | Modifier M, parts | Shrinkage, mils/inch |
|---|---|---|---|---|---|
| 1 | LP-B | 3400 | 1.1 | 7.0 | 0.42 |
| 2 | LP-B | 6060 | 1.2 | 3.4 | 0.52 |
| 3 | LP-B | 3480 | 1.7 | 4.0 | 0.00 |
| 4 | LP-B | 3970 | 1.4 | 3.8 | 0.42 |
| 5 | LP-B | 3920 | 0.71 | 6.0 | 0.33 |
| 6 | LP-B | 7540 | 1.5 | 3.0 | 0.65 |
| 7 | LP-B | 11,860 | 1.2 | 2.8 | 0.52 |
| 8 | LP-A | 5000 | 0.8 | 12 | 0.19 |

EXAMPLE 6

Surfactant Screening Studies

In this series of experiments, the following standard formulation was mixed in a ½-pint can, stirred with a Cowles dissolver (spinning propeller type), poured into a 3-inch (diameter) aluminum disk, and immediately cured for 15 minutes at 150° C. While the samples were all cast, not molded under pressure, the pigmentability evaluation correlates well with the results obtained for similar formulations in molded parts. While the thickener (MgO in this case) must be present in the samples, the mixture must be cured before the mixture has thickened or increased in viscosity. The probable reason for this is that, in the absence of pressure, there is insufficient flow in thickened mixtures to obtain homogeneous castings.

The standard formulation used in these screening experiments is shown in Table XIII:

TABLE XIII

| Component | Parts, by weight |
|---|---|
| Polyester D | 30 |
| Low Profile Additive | 17.5 |
| Styrene | 2.5 |
| Camel Wite | 87.5 |
| Zinc Stearate | 1.5 |
| CM-2015 Pigment | 5.3 |
| t-Butyl Perbenzoate | 0.5 |
| Modifier M | varied |
| Surfactant | varied |

After curing and removing from the aluminum dish, the cast parts were rated visually for depth of color, uniformity of pigmentation, presence or absence of small white specks, and mottling. The six formulations shown below in Table XIV were used as standards against which all the others were compared. The worst was given a rating of 1, the best 6, with the others being intermediate between them. The six standard formulations were the following (the LP-B employed in this Example was the one described in Example 1):

TABLE XIV

| Component | Rating | | | | | |
|---|---|---|---|---|---|---|
| | 1 | 2 | 3 | 4 | 5 | 6 |
| LP-A | 17.5 | — | — | — | — | — |
| LP-B | — | 17.5 | 17.5 | 17.5 | — | 17.5 |
| LP-C | — | — | — | — | 17.5 | — |
| Modifier M | 1.25 | 1.25 | 0.75 | 0.75 | 0.5 | 0.75 |
| Surfactant A | 3 | — | 3 | 6 | — | — |
| Surfactant B[(1)] | — | — | — | — | — | 3.6 |

[(1)] 42 weight percent styrene solution of sodium salt of alpha-olefin sulfonate In the surfactant screening series, the low profile additive employed was LP-B. Each surfactant was used in two proportions, 3 and 6 weight percent of active surfactant, based on weight of polyester, LP-B, plus styrene. Modifier M was used in amounts of 0.75 parts, by weight. Table XV, below, displays the chemical name of the surfactant, its Trade Name, its classification in McCutcheon's 1975 Edition of "Detergents & Emulsifiers", and the pigmentability ratings for the two proportions of surfactant used. In the table, "EO" represents ethylene oxide, "PO" represents propylene oxide, "NC" represents "did not cure", and the surfactants marked with an asterisk* were employed as a solution in styrene.

TABLE XV

| Surfactant | Class | Pigmentability | |
|---|---|---|---|
| | | 3% | 6% |
| "TERGITOL Min Foam 2x" EO/PO adduct of linear alcohol | AT-28 | 2 | 1 |
| "TERGITOL Min Foam 1x" EO/PO adduct of linear alcohol | AT-28 | 1 | 1 |
| "TERGITOL 15-S-3" EO adduct of linear alcohol | AT-28 | 1 | 2 |
| "TERGITOL 15-S-5" EO adduct of linear alcohol | AT-28 | 3 | 1 |
| "TERGITOL 15-S-9" EO adduct of linear alcohol | AT-28 | 1 | 3 |
| "TERGITOL 15-S-15"* EO adduct of linear alcohol | AT-28 | 2 | 2 |
| "TERGITOL 15-S-30"* EO adduct of linear alcohol | AT-28 | 2 | 1 |
| "TERGITOL 15-S-50" EO adduct of linear alcohol | AT-28 | 1 | 2 |
| "TERGITOL TMN-6" Trimethylnonyl poly(EO) ether | AR-12 | 4 | 3 |
| "TERGITOL TMN-10" Trimethylnonyl poly(EO) ether | AR-12 | 4 | 3 |
| "TERGITOL-08" Na(2-ethyl-1-hexanol) Sulfate | AP-10 | 4 | NC |
| "TERGITOL-4" Na(7-ethyl-2-methyl-4-undecanol) Sulfate | AP-12 | 3 | 1 |
| "TERGITOL 15-S-7" EO adduct of linear alcohol | AT-28 | 1 | NC |
| "Pluronic F-98"* EO/PO adduct of propylene glycol | AW-80 | 2 | 3 |
| "Pluronic F-88"* EO/PO adduct of propylene glycol | AW-80 | 2 | 1 |
| "Pluronic F-68"* EO/PO adduct of propylene glycol | AW-80 | 2 | 2 |
| "Pluronic F-68LF"* EO/PO adduct of propylene glycol | AW-80 | 2 | 2 |
| "TERGITOL XH"* EO adduct of linear alcohol | AT-28 | 2 | 2 |
| "TERGITOL XJ" EO adduct of linear alcohol | AT-28 | 2 | 2 |
| "TERGITOL 15-S-40"* EO adduct of linear alcohol | AT-28 | 2 | 2 |
| "TERGITOL 15-S-12" EO adduct of linear alcohol | AT-28 | 2 | 1 |
| "Pluronic 31R4" EO/PO adduct of ethylene glycol | AW-82 | 2 | 1 |
| "Pluronic 31R1" EO/PO adduct of ethylene glycol | AW-82 | 2 | 1 |
| "Pluronic 17R4" EO/PO adduct of ethylene glycol | AW-82 | 3 | 2 |
| "Neodol 25-3" EO adduct of ethylene glycol | AT-28 | 1 | 1 |
| Neodol 25-7" EO adduct of linear alcohol | AT-28 | 1 | 1 |
| "Neodol 25-12" EO adduct of linear alcohol | AT-28 | 2 | 2 |
| "Neodol 25-3A" NH4 salt of EO adduct of linear alcohol sulfate | AQ-18 | 4 | 1 |
| "Neodol 25-3S" Na salt of EO adduct of linear alcohol sulfate | AQ-18 | 4 | NC |
| "Plurafac RA-43" EO/PO adduct of ethylene glycol | AW-82 | 1 | 2 |
| "Plurafac RA-40" EO adduct of linear alcohol | AT-28 | 1 | 1 |
| "Plurafac D-25" EO adduct of linear alcohol (Modified) | AT-28 | 2 | 2 |
| "Ucane 11" Na alkylbenzene sulfonate | AK-8 | 6 | — |
| "Calsoft T-60" triethanolamine dodecylbenzene sulfonate | B-13 | 6 | 6 |
| Glyceryl monooleate | AE-14 | 2 | 2 |
| Glyceryl dioleate | AE-14 | 2 | 1 |
| Glyceryl trioleate | AE-23 | 1 | 1 |
| Polyglycerol oleate | AE-14 | 3 | 2 |
| "Tween 80" Sorbitan monooleate | W-9 | 1 | 2 |
| "Tween 21" EO adduct of sorbitan monooleate | W-5 | 3 | 3 |
| "Abrosol O" Diethanolamine-oleic acid condensate | A-28 | 2 | 2 |
| "Brij 30" EO adduct of lauryl alcohol, 4 EO's | BB-4 | 2 | 2 |
| Na propyl oleate sulfonate | AO-2 | 4 | 4 |
| "Miranol MSA" Na 2-Caprylic-1-(Ethyl beta oxipropanoic acid) Imidazoline | BA-6 | 4 | 1 |
| "Petronate K" Na petroleum sulfonate | AI-6 | 2 | 1 |
| Na Xylene sulfonate | AJ-18 | 4 | 3 |
| "Tide" - mixture of Na tallow alcohol sulfate and linear alkyl benzene sulfonate | BO | 4 | 3 |
| Na alpha-olefin sulfonate* | AG-1 | 6 | 5 |
| Na alpha-olefin sulfonate (powder form) | AG-1 | 2 | 1 |
| "Centrolene-S" Lecithin | M-1 | 2 | 1 |
| "Aerosol C-61" Ethoxylated alkylguanidine amine complex | BM | 3 | 1 |
| "Igepon T-33" Na and Methyl-N—oleyl taurate | H-4 | 3 | 3 |
| "Igepon TN-74" Na and Methyl-N—palmitoyl taurate | H-6 | 3 | — |
| "Igepon Ac-78" Coconut ester, Na isethionate | I-12 | 4 | 3 |
| "Aerosol OT-75" Dioctyl Na isethionate | I-12 | 4 | 3 |
| "Triton X-100" EO adduct of octylphenol | AR-8 | 2 | 2 |
| "Triton X-45" EO adduct of trimethylnonylphenol | AR-12 | 3 | 2 |
| "Emulphor ON-877" EO adduct of fatty alcohol | AT-26 | 5 | 5 |
| "Emulphor VN-430" EO adduct of fatty acid | AU-22 | 1 | 1 |
| "Emulphor EL-719" EO adduct | AU-24 | 2 | 2 |

TABLE XV-continued

| Surfactant | Class | Pigmentability 3% | Pigmentability 6% |
|---|---|---|---|
| of vegetable oil | | | |
| Polyethylene glycol 600 monooleate | AW-6 | 2 | 2 |
| Polyethylene glycol 600 dioleate | AW-8 | 2 | 2 |
| Polyethylene glycol 200 monostearate | AW-42 | 1 | 2 |
| Polyethylene glycol 200 distearate | AW-48 | 2 | 1 |
| "Arquad C-50" Trimethyl cocoammonium chloride | D-17 | 3 | 5 |
| Arquad S-50" Trimethyl soyammonium chloride | D-17 | 3 | 6 |
| "Arquad T-50" Trimethyl tallow-ammonium chloride | D-17 | 5 | 5 |
| "Ethoquad O/12" Polyethoxylated quaternary ammonium chloride-ethoxylated alkylol amide/amine-oleic | C-33 | 4 | 2 |
| "Ethomeen T-12" Bis(2-hydroxyethyl)tallow amine | C-37 | 2 | 2 |
| "Ethodumeen T-20" N,N'—polyoxethylene(10)-N—tallow-1,3-diaminopropane | C-37 | 2 | 2 |
| "Nekal BA-77" Na alkyl naphthalene sulfonate | S-15 | 2 | 2 |
| "Daxad 21" Monocalcium polymerized alkyl aryl sulfonic acid | AB-2 | 4 | 2 |
| "Byk-Mallinkrodt ST-80" Silicone | P-2 | 2 | 3 |
| "Byk-Mallinkrodt ST-60" silicone | P-2 | 3 | 1 |
| "Byk-Mallinkrodt FL-0" Silicone | P-2 | 3 | 3 |
| "Byk-Mallinkrodt Mallinkrodt FL-1" Silicone | P-2 | 3 | 3 |
| "Norlig 11 DA" Lignosulfonic acid derivative | L-10 | 2 | 1 |
| "Marasperse N-22" Na ligno-sulfonate | L-8 | 4 | 4 |
| "Ultrawet DS" Na alkyl aryl sulfonate | AK-8 | 4 | 4 |
| "Sellogen HR-90" Na alkyl naphthalene sulfonate | S-15 | 4 | 1 |
| "Conoco SA-597" dodecyl benzene sulfonic acid | AK-12 | 5 | 5 |
| "Dowfax 2A1" Na dodecyl diphenyl ether disulfonate | AL-8 | 4 | 4 |
| "Tamol SN" Na salt of condensed naphthalene sulfonate | S-15 | 3 | 3 |
| "Silicone L-76"[1] | P | 4 | 2 |
| "Silicone Y-5900"[1] | P | 2 | 2 |
| "Silicone L-45"[1] Polydimethylsiloxane | P-2 | 5 | 1 |
| "Silicone Y-6446"[1] | P | 4 | 1 |
| "Silicone W-900"[1] | P | 4 | 2 |
| "Silicone S-10"[1] | P | 2 | 1 |
| "Silicone S-50"[1] | P | 1 | 1 |
| "Silicone L-5420"[1] Siloxane-polyoxyalkylene Block copolymer | P-6 | 2 | 2 |
| "Silicone L-5303"[1] Siloxane-polyoxyalkylene Block Copolymer | P-6 | 2 | 2 |
| "Siponate DS-10"* Na dodecylbenzene sulfonate | AK-8 | 3 | 4 |
| Dioctyl Na Sulfosuccinate | V-8 | 3 | 3 |

[1] All silicones used in proportions of 0.3 and 0.6 percent.

Those surfactants that are solids in the 100 percent active form should be dissolved in a solvent, preferably styrene, before being added to the mixture in order to ensure complete and uniform distribution throughout the mixture.

The following surfactants yielded a pigmentability rating of 3 or more, in at least one of the two concentrations employed, which means that they improved the pigmentability when compared with the same formulation containing no surfactant:

TABLE XVI

The following structure types with LP-B gave better color ratings than the polyester plus LP-B and no surfactant

| Structure Type | Trade Name | Surfactant Class. No. | Manufacturer |
|---|---|---|---|
| 1. Ethoxylated/Propoxylated Amides/Amines | Ethoquad 0/12 | C-33 | Armak Co. |
| 2. Amines and Quaternary Derivatives | Arquad C-50; S-50; T-SO | D-17 | Amrak Co. |
| 3. Fatty Taurates | Igepon T-33 | H-4 | GAF |
|  | Igepon TN-74 | H-6 | GAF |
| 4. Isethionates | Igepon AC-78 | I-12 | GAF |
| 5. Lignin Derivatives | Marasperse N-22 | L-8 | American Can Co. |
| 6. Silicone Derivatives | Byk-Mallinckrodt FL-0; FL-1 | P-2 | Byk-Mallinckrodt |
|  | UCC L-45; L-76; W-900; Y-6446 | P-2 | Union Carbide Corp. |
| 7. Succinate, Sulfo Derivatives | Aerosol OT-75 | V-8 | American Cyanamid |
| 8. Sorbitan Derivatives | Tween 21 | W-5 | ICI America |
| 9. Naphthalene Sulfonates | Sellogen HR-90 | S-15 | Nopco Chemical Div. |
|  | Tamol SN | S-15 | Rohm and Haas |
| 10. Polymers | Daxad 21 | AB-2 | Dewey and Almy Chem. Co. |
| 11. Glycerol Fatty Esters | Polyglycerol ester of oleic acid | AE-14 | — |
| 12. Olefin Sulfonates (alpha) | alpha olefin sulfonate | AG-1 | — |
| 13. Aryl Sulfonates | Sodium Xylene Sulfonate | AJ-18 | — |

TABLE XVI-continued

The following structure types with LP-B gave better color ratings than the polyester plus LP-B and no surfactant

| Structure Type | Trade Name | Surfactant Class. No. | Manufacturer |
|---|---|---|---|
| 14. Diphenyl Sulfonates | Dowfax 2A1 | AL-8 | Dow Chemical Co. |
| 15. Fatty Acid (Oil) Sulfates and Sulfonates | Sulfated propyl oleate, sodium salt | AO-2 | — |
| 16. Alcohol Sulfates | Tergitol 08 | AP-10 | Union Carbide |
|  | Tergitol 4 | AP-12 | Union Carbide |
| 17. Ethoxylated Alcohol Sulfates and Sulfonates | Neodol 25-3A | AQ-18 | Shell |
|  | Neodol 25-3S | AQ-18 | Shell |
| 18. Ethoxylated Alkyl (Aryl) Phenol Sulfates | Tergitol TMN-6; TMN-10 | AR-12 | Union Carbide |
|  | Triton X-45 | AR-12 | Rohm and Haas |
| 19 Ethoxylated Alcohols (Propoxylated) | Emulphor ON-877 | AT-26 | GAF |
|  | Tergitol 15-S-9; 15-S-5 | AT-28 | Union Carbide |
| 20. Fatty Glycols and Propoxylated Glycols | Pluronic F-98 | AW-80 | BASF Wyandotte |
|  | Pluronic 17R4 | AW-82 | BASF Wyandotte |
| 21. Alkyl Aryl Sulfonates | UCANE 11 | AK-8 | Union Carbide |
|  | Ultrawet DS | AK-8 | ARCO Chemical |
|  | Siponate DS-10 | AK-8 | Alcolac, Inc. |
|  | Conoco SA-597 | AK-12 | Conoco Chemical Co. |
|  | Calsoft T-60 | AK-16 | Pilot Chemical Co. |
| 22. Amphoterics | Miranol MSA | BA-6 | Miranol Chem. Co. |
| 23. Cationic Surfactants (General) | Aerosol C-61 | BM | American Cyanamid |
| 24. Formulated/Blended Compds. and Mixtures | TIDE (mixture of tallow alcohol sulfonate and linear alkyl benzene sulfonate) | BO | Proctor and Gamble |

EXAMPLE 7

The general procedure of Example 1 was employed to prepare 12×12 inch molded panels from the following formulations:

TABLE XX

| Component | Run No. (1) | (2) | (3) | (4) |
|---|---|---|---|---|
| Polyester D | 300 | 300 | 300 | 300 |
| LP-A | 150 | — | — | — |
| LP-C | — | 172 | — | — |
| LP-B | — | — | 150 | — |
| LP-D | — | — | — | 180 |
| Styrene | 50 | 28 | 50 | 20 |
| Camel Wite | 875 | 875 | 875 | 875 |
| Zinc Stearate | 20 | 20 | 20 | 20 |
| t-Butyl perbenzoate | 5 | 5 | 5 | 5 |
| CM-2015 | 42 | 42 | 42 | 42 |
| Modifier M | 15 | 15 | 10 | 10 |
| Paste Sample | 175 | 175 | 175 | 175 |
| PPG-303 Glass (10%) | 128 | 128 | 128 | 128 |

Visual panel evaluations for pigmentability consisted of comparing the finished panels for color depth (pigment), dispersion of pigment, glossiness, etc. The pigmentability ratings of these four systems containing different low profile additives were as follows:

| Formulation No. | Pigmentability |
|---|---|
| #2 (Containing LP-C) | Best |
| #3 (Containing LP-B) | Less |
| #4 (Containing LP-D) | Less |
| #1 (Containing LP-A) | Worst |

What is claimed is:

1. A curable molding composition containing:
   (a) an unsaturated polyester resin that is suitable for use in molding and which comprises the reaction product of an olefinically unsaturated dicarboxylic acid or anhydride and a polyol;
   (b) an olefinically unsaturated monomer that is copolymerizable with said polyester resin;
   (c) a thickening agent comprising an oxide or hydroxide of a metal of Group I, II, or III of the Periodic Table;
   (d) a pigment;
   (e) a low profile additive comprising a vinyl acetate/maleic acid copolymer; and
   (f) a surface active compound that is employed in an amount sufficient to enhance the uniformity of the pigmentation of the cured composite produced from said curable molding composition.

2. The curable molding composition of claim 1 wherein the olefinically unsaturated monomer is styrene.

3. The curable molding composition of claim 2 wherein the thickening agent is magnesium oxide or magnesium hydroxide.

4. The curable molding composition of claim 1 wherein the surface active compound is a member selected from the group consisting of:
   (a) a sulfonic acid or an alkali metal, alkaline earth metal, or ammonium salt thereof;
   (b) an ethylene oxide adduct of a long chain aliphatic alcohol;
   (c) a polyoxyethylene-polyoxypropylene block copolymer;
   (d) polyglycerol oleate;
   (e) ethoxylated sorbitan monooleate;
   (f) sodium 2-caprylic(ethyl beta oxipropanoic acid) imidazoline;
   (g) ethoxylated alkylguanidine amine complex;
   (h) sodium and methyl-N-long chain aliphatic taurate;
   (i) sodium isethionate coconut ester;
   (j) ethoxylated long chain alkylphenol;

(k) N-long chain aliphatic quaternary ammonium halide; and (l) polydimethylsiloxane oil.

5. The curable molding composition of claim 1 wherein the surface active compound is sodium dodecylbenzene sulfonate.

6. The curable molding composition of claim 1 wherein the surface active compound is a sulfonic acid or an alkali metal, alkaline earth metal, or ammonium salt thereof.

7. A curable molding composition containing:
(a) an unsaturated polyester resin that is suitable for use in molding and which comprises the reaction product of an olefinically unsaturated dicarboxylic acid or anhydride and a polyol;
(b) an olefinically unsaturated monomer that is copolymerizable with said polyester resin;
(c) a thickening agent comprising an oxide or hydroxide of a metal of Group I, II, or III of the Periodic Table;
(d) a pigment;
(e) a low profile additive comprising a vinyl acetate/maleic acid copolymer.

8. The cured composite produced by curing the composition of claim 1.

9. The cured composite produced by curing the composition of claim 7.

10. A process for the preparation of a pigmented curable molding composition comprising effecting the mixture of an unsaturated polyester resin that is suitable for use in molding and which comprises the reaction product of an olefinically unsaturated dicarboxylic acid or anhydride and a polyol, an olefinically unsaturated monomer that is copolymerizable with said polyester resin, a thickening agent comprising an oxide or hydroxide of a metal of Group I, II or III of the Periodic Table, a pigment, and a low profile additive comprising a vinyl acetate/maleic acid copolymer.

11. A process as claimed in claim 10 wherein the mixture further comprises a surface active compound in an amount sufficient to enhance the uniformity of pigmentation of a cured composite produced from said pigmented curable molding composition.

12. A process for making a pigmented molded article having a smooth surface which comprises molding at an elevated temperature a pigmented curable molding composition comprising an unsaturated polyester resin that is suitable for use in molding and which comprises the reaction product of an olefinically unsaturated dicarboxylic acid or anhydride and a polyol, an olefinically unsaturated monomer that is copolymerizable with said polyester resin, a thickening agent comprising an oxide or hydroxide of a metal of Group I, II or III of the Periodic Table, a pigment, and a low profile additive comprising a vinyl acetate/maleic acid copolymer.

13. A process as claimed in claim 12 wherein the pigmented curable molding composition further comprises a surface active compound in an amount sufficient to enhance the uniformity of pigmentation of the pigmented molded article produced from said pigmented curable molding composition.

14. A pigmented molded article having a smooth surface prepared by the process of claim 12.

15. A pigmented molded article having a smooth surface prepared by the process of claim 13.

* * * * *